(12) United States Patent
Shim

(10) Patent No.: US 6,333,596 B1
(45) Date of Patent: Dec. 25, 2001

(54) FUNCTIONAL FILM AND CATHODE RAY TUBE EMPLOYING THE SAME

(75) Inventor: Myun-gi Shim, Seoul (KR)

(73) Assignee: Samsung Display Devices Co., Ltd., Suwon (KR)

( * ) Notice: Subject to any disclaimer, the term of this patent is extended or adjusted under 35 U.S.C. 154(b) by 0 days.

(21) Appl. No.: 09/312,709

(22) Filed: May 17, 1999

(30) Foreign Application Priority Data

Jan. 13, 1999 (KR) .......................................... 99-715

(51) Int. Cl.[7] .................................................. H01J 31/00
(52) U.S. Cl. ............................ 313/479; 313/478; 313/480
(58) Field of Search .................................. 313/479, 478, 313/480, 112, 113; 348/834, 835; 359/530, 586, 589

(56) References Cited

U.S. PATENT DOCUMENTS

| | | | |
|---|---|---|---|
| 4,191,725 | * 3/1980 | Armstrong et al. | 348/834 |
| 4,521,524 | * 6/1985 | Yamashita | 313/480 |
| 4,958,148 | * 9/1990 | Olson | 348/835 |
| 5,717,282 | * 2/1998 | Oomen et al. | 313/479 |
| 5,811,923 | * 9/1998 | Zieba et al. | 313/479 |
| 5,879,217 | * 3/1999 | Saito et al. | 348/834 |
| 5,910,356 | * 6/1999 | Ishikawa et al. | 313/479 |
| 5,959,762 | * 9/1999 | Bandettini et al. | 348/835 |
| 5,998,920 | * 12/1999 | Kim | 313/479 |
| 6,020,678 | * 2/2000 | Machara | 313/479 |

* cited by examiner

Primary Examiner—Nimeshkumar D. Patel
Assistant Examiner—Mariceli Santiago
(74) Attorney, Agent, or Firm—Leydig, Voit, & Mayer, Ltd.

(57) ABSTRACT

A cathode ray tube (CRT) includes a base film and a reflection preventing multiple layer film on one surface of the base film, an adhesive layer on the other surface of the base film, including an adhesive polymer resin, and at least one organic or inorganic pigment or dye having a main light absorption region including a wavelength of 490 or 575 nm. The reflection preventing multiple layer film has, alternately stacked, a high refractive layer and a low refractive layer. The functional film has a wide application range, e.g., from a dark tint panel having low light transmission to a clear panel having a light transmission of 80% or more. A CRT having such a functional film has improved contrast characteristics and provides a high quality of picture and good color. The film is attached to the external surface of the glass panel at room temperature so that physical and other characteristics of the CRT are not adversely affected by sintering at a high temperature.

10 Claims, 2 Drawing Sheets

FUNCTIONAL FILM AND CATHODE RAY TUBE EMPLOYING THE SAME

BACKGROUND OF THE INVENTION

1. Field of the Invention

The present invention relates to a functional film, and more particularly, to a functional film having excellent contrast and antistatic characteristics and capable of providing a high quality of picture and a good body color, and a cathode ray tube (CRT) adopting the same.

2. Description of the Related Art

FIG. 1 is a sectional view of a general CRT. As shown in FIG. 1, the general CRT includes a panel 11, a fluorescent layer 12 formed inside the panel 11 with a predetermined pattern, a shadow mask frame assembly 13 installed inside the panel 11, and a funnel 14 having a cone portion 14a and a neck portion 14b forming a bulb of the CRT which is attached to the panel 11. Here, a deflection yoke 15 is installed around the cone portion 14a and an electron gun 16 is inserted in the neck portion 14b.

Here, a curved panel having a predetermined curvature is generally used as the panel. However, a problem of having a curved panel is that dazzling and distortion of the picture become serious at the outer area of the panel, so it is difficult to display a high quality picture.

In order to make up for the problem, a panel having an infinite curvature, i.e., a planar panel, has been suggested.

The larger the curvature is, that is, the flatter the panel is, the more the dazzling, caused by reflection of external light, is suppressed, so a distinct picture can be obtained without distortion of the picture and eye strain.

FIG. 2A shows an example of a planar panel, in which the inner and outer surfaces of the panel are both planar. However, in a case where a cathode ray tube (CRT) adopts such a panel, the picture is seen to be apparently compressed at the center of the panel.

To solve this problem, a planar panel having a flat outer surface and a curved inner surface having a predetermined curvature, as shown in FIG. 2B, has been suggested.

However, the planar panel having the above structure has a problem in that transmission is different at the center and the peripheral areas due to the difference in thickness. Further, if the planar panel having the above structure is applied to a generally used dark tint or semi tint panel of which transmission is 40~50%, the difference in transmission at the center and peripheral areas of the panel increases. As a result, it is difficult to obtain a uniform quality of picture. Thus, a clear tint panel having a transmission of 80% or more is usually adopted.

However, reflection of external light becomes serious as the transmission of the panel increases, thereby lowering contrast. That is, if external light is incident, an afterimage is formed on the outer surface of the panel, so that the picture displayed on the inner surface of the panel overlaps with the afterimage, thereby lowering contrast.

Also, another problem of the planar panel is that subillumination occurs at regions where each color overlaps when a fluorescent body is illuminated, thereby lowering the purity and range of color reproduced.

In addition, a common problem of the CRT is the accumulation of charge before and after the operation of the CRT at the outer surface of the panel, and hence generation of static electricity. When static electricity is generated, dust sticks to the outer surface of the panel, thereby deteriorating the appearance. Also, in some cases, an operator may be electrically shocked by the static electricity.

As a method capable of overcoming the above-described various problems, a dispersion, obtained by dispersing conductive particles such as antimony-doped tin oxide (ATO) or indium tin oxide (ITO) in silicate, is applied to the outer surface of the panel. However, this method does not sufficiently prevent reflection of the external light even though it can enhance the antistatic characteristics. Thus, dazzling and purity of color are not still improved.

Another method is to directly sputter a high refractive material and a low refractive material onto the external surface of the panel in turn using a sputtering method or a chemical vapor deposition (CVD) method such that a layer made of a material having a high refractive index (hereinafter, refer to a high refractive layer) and a layer made of a material having a low refractive index (hereinafter, refer to a low refractive layer) are alternately formed. According to this method, reflection of the external light caused by interference and electromagnetic shielding are prevented. However, this method cannot provide an improvement in the purity of color, and requires very expensive equipment.

Still another method is to attach a film to the external surface of a glass panel, and the present invention relates to this method.

SUMMARY OF THE INVENTION

It is an object of the present invention to provide a functional film which has antistatic properties, prevents reflection of external light and suppresses subillumination.

It is another object of the present invention to provide a cathode ray tube (CRT) adopting the functional film according to the present invention.

To achieve the first object of the present invention, there is provided a functional film comprising: a base film; a reflection preventing multiple layer formed on one surface of the base film in which a high refractive layer and a low refractive layer are alternatively stacked; and an adhesive layer formed on the other surface of the base film, comprising an adhesive polymer resin, and one or more organic or inorganic pigment or dye of which main light absorption region includes a wavelength of 490 or 575 nm.

To achieve the second object of the present invention, there is provided a cathode ray tube (CRT) comprising a panel provided with the functional film described above on the external surface thereof, a fluorescent layer formed inside the panel with a predetermined pattern, a shadow mask frame assembly installed inside the panel, and a funnel forming a bulb of the CRT while being attached to the panel and having a cone portion on which a deflection yoke is installed and a neck portion into which an electron gun is inserted.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

In a functional film according to the present invention, the base film is not limited to a specific film or a predetermined thickness. That is, any transparent polymer film which is excellent in mechanical strength and chemical stability may be used as the base film. However, using a polyester resin with a thickness of 170~190 µm is preferred.

Also, a reflection preventing multiple layer film is formed by alternately stacking a high refractive layer and a low refractive layer in two or more layers, preferably, up to 4~6 layers. Particularly, the high refractive layer includes high purity conductive particles having a high refractive index, preferably, antimony-doped tin oxide (ATO), indium tin oxide (ITO) or antimony zinc oxide (AZO), and the low refractive layer includes silicate.

In addition, the adhesive layer is not limited to a specific type. However, using an adhesive polymer resin which is common in the field of the invention is preferred. For example, a polyester resin having a refractive index similar to that of the panel may be used.

Also, a hard coating layer which is excellent in mechanical strength may be further formed on at least one side of the base film to reinforce mechanical strength. Such a hard coating layer can be a polymer resin having a refractive index similar to that of the base film.

Figure 1:
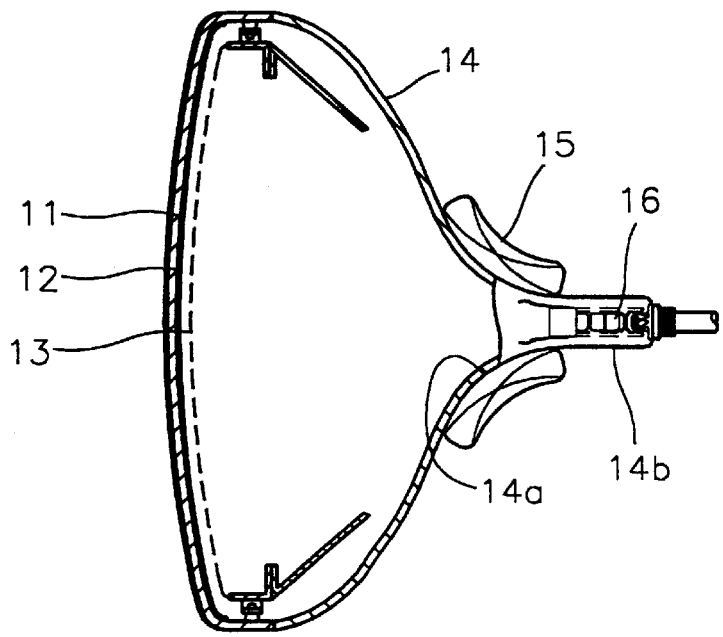
FIG. 1 is a side sectional view of a conventional cathode ray tube (CRT)
Figure 2A:
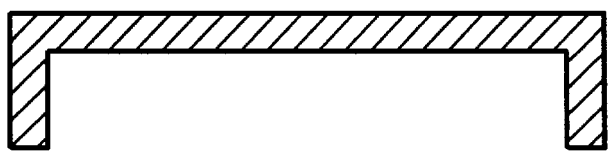
FIG. 2A is an example of a planar panel of a CRT.
Figure 2B:
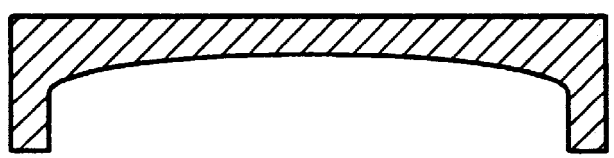
FIG. 2B is another example of a planar panel of a CRT.
Figure 3B:
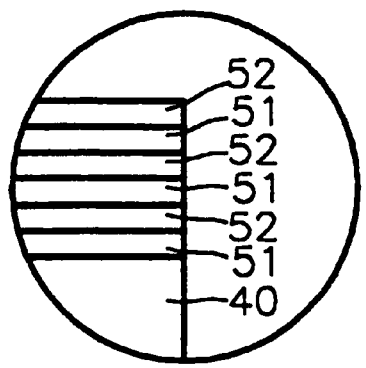
FIGS. 3A and 3B are sectional views of a functional film according to a preferred embodiment of the present invention.
Figure 3A:
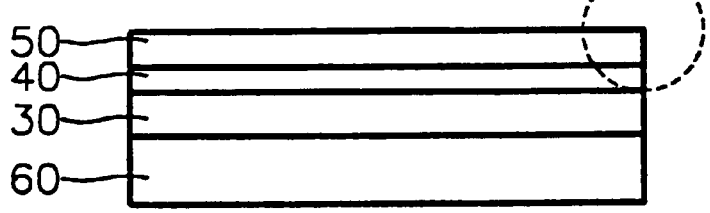

FIGS. 3A and 3B are sectional views of a functional film according to a preferred embodiment of the present invention.

Referring to FIGS. 3A and 3B; a hard coating layer 40 for reinforcing the mechanical strength of the functional film, and a reflection preventing multiple layer 50 in which a high refractive layer 51 comprising conductive particles such as ITO, ATO or AZO and a low refractive layer 52 are alternatively stacked, are formed in sequence on one side of a base film 30, and an adhesive layer 60 comprising an adhesive polymer resin and at least one organic or inorganic pigment or dye is formed on the other side of the base film 30.

Here, preferably, the base film 30 is a polyester film which is transparent and excellent in mechanical strength and chemical stability, and more preferably, a polyethyleneterephtalate film. Also, the thickness of the base film is 170~190 µm. If the thickness of the base film is less than the above range, handling of the base film becomes difficult, and if the thickness of the base film exceeds the above range, contrast characteristics are lowered.

Also, the reflection preventing multiple layer may be formed by sputtering, chemical vapor deposition (CVD) or a general coating method. In addition, the reflection preventing multiple layer film is formed with two or more layers, preferably, with 4~6 layers.

Also, the adhesive layer may be formed by applying a mixture comprising an adhesive polymer resin and organic or inorganic pigment or dye on the base film and then drying the resulting structure. Alternatively, the adhesive layer may be coextruded along with the base film. Another method involves forming a layer of an adhesive polymer resin on the base film, and then a printing at least one organic or inorganic pigment or a dye on the formed layer to a predetermined thickness, thereby completing the adhesive layer.

The functional film according to the present invention includes a reflection preventing multiple layer film on one side of a transparent polymer film having excellent mechanical strength and chemical stability which is used as a base film to provide an antistatic function and prevent reflection of external light, and an adhesive layer comprising an adhesive polymer resin and at least one organic or inorganic pigment or dye is formed on the other side of the base film to improve qualities of picture and body color.

A method for forming a functional film according to a preferred embodiment of the present invention is as follows.

First, a hard coating layer made of a polyester resin is formed on one side of a polyester base film, having a thickness of 170~190 µm, and then a high refractive layer comprising ITO and a low refractive layer comprising silicate are alternately stacked thereon to form a 6 layer multiple coating layer film.

Next, a mixture comprising an adhesive polyester resin having a refractive index similar to a panel, rhodamine pigment a violet pigment and a yellow pigment in a predetermined weight ratio is deposited on the other side of the polyester base film, and then dried, resulting in an adhesive layer.

The adhesive layer of the completed functional film is attached to the external surface of the panel of a CRT.

The CRT in which the functional film of the present invention is attached to the external surface of the panel through the adhesive layer of the film is excellent in contrast and antistatic characteristics, and provides a high quality of picture and a good body color.

Hereinafter, the present invention will be described in detail through the following examples. However, the present invention is not limited to the following.

EXAMPLE 1

A polyethyleneterephtalate film having a thickness of 188 µm, as a base film, was prepared.

Then, ITO was sputtered onto one side of the polyethyleneterephtalate film to form a high refractive layer, and then silicate was sputtered thereon to form a low refractive layer. Such sputtering was repeated three times, resulting in a 6-layered reflection preventing layer film.

A mixture comprising an adhesive polyester resin, rhodamine pigment, a violet pigment and a yellow pigment in a weight ratio of 100:1:2:0.1 was deposited on the other side of the polyethyleneterephtalate film, and then dried, to form an adhesive layer, thereby completing a functional film.

The obtained functional film was attached to the external surface of a CRT whose panel had a transmission of approximately 53%, and then surface resistance, contrast and color reproduction range were measured. The results are shown in Table 1.

Comparative Example 1

A functional film was formed by the same method as in Example 1 except that the adhesive layer was formed of only an adhesive polyester resin. After the functional film was attached to the panel of a CRT, surface resistance, contrast and reproduction color range were measured. The results are shown in Table 1.

Comparative Example 2

30 g of tetraethylorthosilicate was mixed with a mixture comprising 330 g of ethanol and 30 g of water, and HCl was added to the mixture to adjust the pH to 1, and then hydrolyzed at 50° C. for 24 hours, to prepare a silicate dispersion. Then, ATO with an average particle size of 30 nm, 0.2 g of a rhodamine pigment and 0.4 g of a violet pigment were added to the dispersion under ultra sonic wave treatment to prepare a coating composition.

Then, the resultant coating composition was spin-coated on the external surface of the panel of a CRT, the panel having transmission of approximately 53%, and dried and then sintered, resulting in a CRT coated with a coating layer. Then, surface resistance, contrast and range of reproduced color of the obtained CRT were measured. The results are shown in Table 1.

Comparative Example 3

As a control, a CRT having a panel with a transmission of approximately 53% was prepared, and surface resistance, contrast and range of reproduced color of the uncoated CRT were measured. The results are shown in Table 1.

TABLE 1

| examples | surface resistance ($\Omega/\square$) | contrast (%)* | color reproduction range (%)* |
| --- | --- | --- | --- |
| Example 1 | $10^2$ | 157 | 103 |
| Comparative Example 1 | $10^2$ | 147 | 100 |
| Comparative Example 2 | $10^7$ | 130 | 103 |
| Comparative Example 3 | $10^{12}$ | 100 | 100 |

*The above values are relative values with respect to the values of Comparative Example 3.

From Table 1, it can be understood that the CRT (Example 1) to which the functional film according to the present invention is attached has an excellent contrast characteristic and color reproducibility. Also, the CRT of Example 1 is good in antistatic property due to its low surface resistance.

Meanwhile, in the case of the CRT to which the adhesive layer formed of only adhesive resin (Comparative Example 1) is attached, the color reproducibility was not good. The CRT having the coating layer made of coating composition (Comparative Example 2) was good in contrast characteristic and color reproducibility, and had an unsatisfactory antistatic function due to its high surface resistance.

As described above, the functional film according to the present invention has advantages as follows: (1) it suppresses the reflection of external light and the subillumination, and has an excellent antistatic function, (2) it has a wide application range, e.g., from a dark tint panel having a low transmission of about 43% to a clear tint panel having a high transmission of about 80% or more, (3) a CRT having such a functional film is excellent in contrast characteristics and provides a high quality of picture and a good body color, and (4) since attaching the film to the external surface of a glass panel is performed at room temperature, physical and other characteristics of the CRT are not deteriorated, unlike a conventional method for forming a coating layer, which requires sintering at a high temperature.

What is claimed is:

1. A functional film comprising:
   a base film having first and second surfaces;
   a reflection preventing multiple layer film on the first surface of the base film and including a high refractive layer and a low refractive layer alternatively stacked; and
   an adhesive layer on the second surface of the base film comprising an adhesive polymer resin, rhodamine pigment, a violet pigment, and a yellow pigment.

2. The functional film of claim 1, wherein the base film is as polyester film.

3. The functional film of claim 1, wherein the reflection preventing multiple layer film includes 2 to 6 layers.

4. The functional film of claim 1, wherein the high refractive layer comprises at least one metal oxide selected from the group consisting of antimony-doped tin oxide, indium tin oxide, and antimony zinc oxide.

5. The functional film of claim 1, wherein the low refractive layer comprises a silicate.

6. A cathode ray tube (CRT) comprising:
   a panel having external and internal surfaces,
   a fluorescent layer on the internal surface of the panel in a pattern,
   a shadow mask frame assembly adjacent the internal surface of the panel,
   a funnel forming a bulb of the CRT and attached to the panel and having cone and neck portions,
   a deflection yoke installed on the neck portion,
   an electron gun in the neck portion, and
   a functional film on the external surface of the panel, the functional film comprising:
     a base film having first and second surfaces;
     a reflection preventing multiple layer film on the first surface of the base film and including a high refractive layer and a low refractive layer alternatively stacked; and
     an adhesive layer on the second surface of the base film adhering the functional film to the external surface of the panel, the adhesive layer comprising an adhesive polymer resin, rhodamine pigment, a violet pigment, and a yellow pigment.

7. The cathode ray tube of claim 6, wherein the base film is a polyester film.

8. The cathode ray tube of claim 6, wherein the reflection preventing multiple layer film includes 2 to 6 layers.

9. The cathode ray tube of claim 6, wherein the high refractive layer comprises at least one metal oxide selected from the group consisting of antimony-doped tin oxide, indium tin oxide, and antimony zinc oxide.

10. The cathode ray tube of claim 6, wherein the low refractive layer comprises a silicate.

* * * * *